United States Patent [19]

Gouldey

[11] Patent Number: 4,824,013
[45] Date of Patent: Apr. 25, 1989

[54] TEMPERATURE CONTROLLER
[75] Inventor: Glenn C. Gouldey, Beaverton, Oreg.
[73] Assignee: Eaton Corporation, Cleveland, Ohio
[21] Appl. No.: 124,711
[22] Filed: Nov. 24, 1987
[51] Int. Cl.[4] ............................................. G05D 15/00
[52] U.S. Cl. .......................... 236/78 R; 236/DIG. 19; 174/58; 337/327
[58] Field of Search ................. 236/78 R, 74 R, 99 B, 236/81, 94, DIG. 19; 206/320, 328, 329; 174/48, 52 R, 52 PE, 58; 200/293; 361/331; 337/338, 306, 319, 327, 380, 381, 398, 121, 20, 42

[56] References Cited

U.S. PATENT DOCUMENTS 4,560,972 12/1985 Britt ................................ 337/380 X

OTHER PUBLICATIONS

"Fan Coil Thermostats-Line Voltage for Series T132 and T134 Series Thermostats", published by Sonne Controls, Portland Oregon.

Primary Examiner—Harry B. Tanner
Attorney, Agent, or Firm—R. A. Johnston

[57] ABSTRACT

A line voltage controller/thermostat for heating and cooling systems. The controller includes a bulb-and-capillary temperature sensor operating a line voltage load current switch. The load current switch is back-mounted on a deck plate adapted for covering a single width wall outlet box with the load switch recessed therein. Separate manually operated line voltage function (fan) switches are front mounted on the deck plate and protected by an impact resistant electrically insulating plastic housing thereover retained on the deck plate by fasteners accessible only from the backside. An outer decorative cover extends over the plastic switch housing and the sensing bulb with an adjustment shaft extending therethrough with adjustment knob thereon.

10 Claims, 3 Drawing Sheets

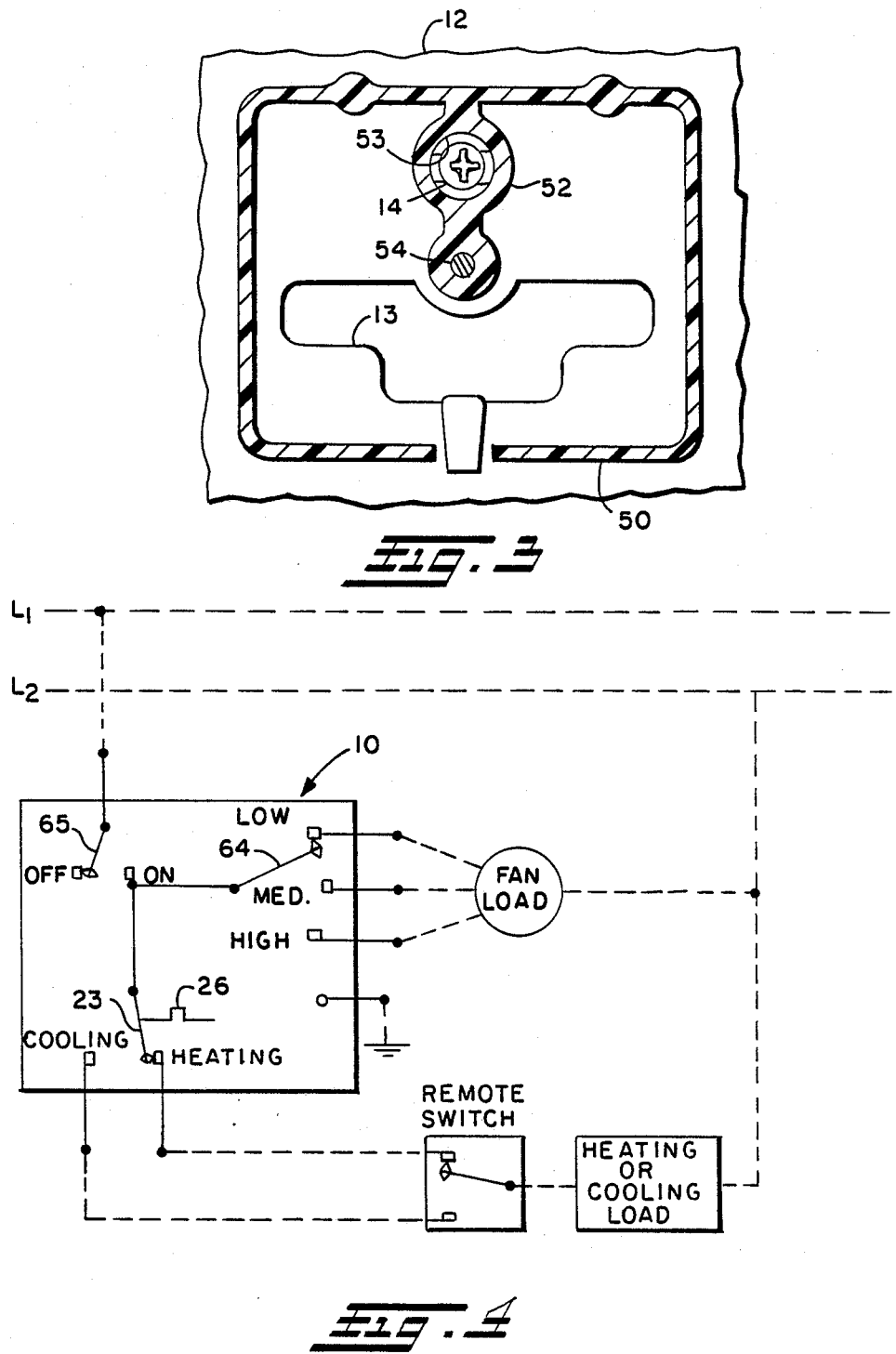

TEMPERATURE CONTROLLER

The present invention is related to Ser. No. 033965 filed Apr. 1, 1987 entitled "Line Voltage Clock Setback Thermostat Control" in the names of G. C. Gouldey, E. M. Shanhan and R. E. Smith".

BACKGROUND OF THE INVENTION

The present invention relates to devices for controlling heating and cooling equipment for buildings and particularly relates to wall thermostats or temperature actuated switches for energizing and de-energizing electrically operated heating and cooling functions. Typically, devices of this type provide a means for sensing the temperature of the room or area of the building for which climatic control is desired; and, in response to sensing predetermined changes in temperature or a predetermined temperature level, actuate electrical switches which employ low voltage current for actuating relays to energize or de-energize line power heating or cooling functions such as resistance heaters or compressors for operating cooling systems and blowers for circulating heated or cooled air. Low voltage thermostats have been employed for many years in building temperature controls to minimize the amount of heavy current carrying wiring to connect the wall thermostats and controls to the centralized heating and cooling equipment. Low voltage thermostats also eliminated the need for providing line voltage electrical insulation, the controls actuated by the building occupants.

However, in recent times it has been found desirable in certain types of building construction to employ individual zone or room heating and cooling systems rather than a central heating or cooling system for the entire building. Where individual systems are employed for heating and cooling small areas such as a single room or a group of small rooms, as for example in apartments or condominiums, it has been found desirable and economical from a building construction standpoint to provide direct line voltage actuation of the heating and cooling system from the wall thermostat, as for example where electric heat pumps are employed. It has also been desirable to provide occupant actuated controls in combination with the thermostatically operated switches for controlling the heating and cooling system for the rooms or areas subject to climate control.

Furthermore, in order to realize economies of construction, it has been desirable to provide line voltage thermostats and system controls in a single width or "gang" electrical wall outlet box. This is particularly desirable in modern building construction wherein interior walls and partitions are fabricated using sheet metal wall studs and plaster board which is attached to the sheet metal studs by mechanical fastening techniques. Single width electrical outlets are desirable in such construction because of the minimum aperture required to be cut in the plaster board and the difficulty encountered in properly anchoring double width electrical outlet boxes to the combination of sheet metal studs and plaster board. Accordingly, it has been desirable to find a way or means of incorporating a line voltage wall thermostat including line voltage switches for fan control into a single width electrical wall outlet box.

It has further been desired to provide for mounting a line voltage thermostat including line voltage fan control switches on a single outlet wall box and to provide for proper electrical installation to minimize hazard from electrical shock and also to provide for resistance against external impact.

Where it is desired to provide line voltage current switching in a wall thermostat, it has been found advantageous to employ a bulb and capillary type temperature sensor because the expansion of the fluid in the bulb and capillary provides sufficient force acting against a diaphragm to enable actuation of a snap-acting switch capable of handling the desired current load at line voltage. However, in attempting to provide a wall thermostat employing a bulb-and-capillary temperature sensor, problems have been encountered in mounting such a device in an economical and adequately insulated manner on a single width electrical wall outlet box. Thus, it has been desired to provide an economical way or means of utilizing a bulb and capillary type temperature sensor for a line voltage wall thermostat combined with line voltage power switching for fan control and to provide such an assemblage in an insulated and protected enclosure for mounting on a single width electrical wall outlet box.

SUMMARY OF THE INVENTION

The present invention provides a line voltage thermostat for controlling energization and de-energization of an electrically operated heating or cooling system in response to sensed changes in temperature in the area subject to climatic control. The wall thermostat of the present invention includes manual switches for functions such as blower operation and blower speed selection.

The wall thermostat of the present invention is adaptable for mounting in a single width or "gang" electrical outlet box for convenience and economies of installation. The wall thermostat assembly of the present invention employs a bulb-and-capillary type temperature sensor with the bulb mounted on the outer face of the wall outlet box cover plate. The line voltage switch assembly actuated by the bulb-and-capillary is mounted on the backside of the cover plate and upon installation is recessed into the electrical outlet box. Thermostat adjustment is accomplished by means of a rotating knob mounted on a shaft which extends from the line voltage thermostatic switch through the outlet box cover plate.

The auxiliary function fan control switches are mounted on the front side of the outlet box cover plate and are protected by a cover housing formed of impact resistant plastic material which is retained onto the outlet box cover plate by fasteners accessible only from the backside of the outlet box cover plate. An overall decorative plastic cover extends over the function switches and the bulb-and-capillary with the adjustment shaft received therethrough and includes a decorative bezel with suitable indicia for enabling user adjustment and the shaft extends through the outer cover. The present invention thus provides a line voltage thermostat having auxiliary line voltage function switches such as fan speed control switches, provided on the outer surface thereof and the thermostat assembly is adapted for mounting over a single width electrical wall outlet box. The wall thermostat assembly of the present invention provides suitable electrical insulation of the line voltage switching components which are attached to the outer surface of the outlet box cover plate and also provides resistance to impact to reduce the hazard of damage to the electrical insulating cover for the line voltage components. The electrical insulating cover is removable only by removing the entire outlet box cover and removing fasteners engagable from the backside of the box cover. The wall thermostat assembly of the present invention thus minimizes the hazard of electrical shock from inadvertent or casual removal of the outer cover and requires the deliberate attempt to remove and disassemble the entire thermostat before the line voltage switching components are exposed in a manner which would create an undue risk of electrical shock.

BRIEF DESCRIPTION OF THE DRAWINGS

FIG. 3 is a section view taken along section-indicating line 3—3 of FIG. 2; and, FIG. 4 is a wiring schematic of the embodiment of FIG. 1 installed in a typical application.

DETAILED DESCRIPTION

Figure 1:
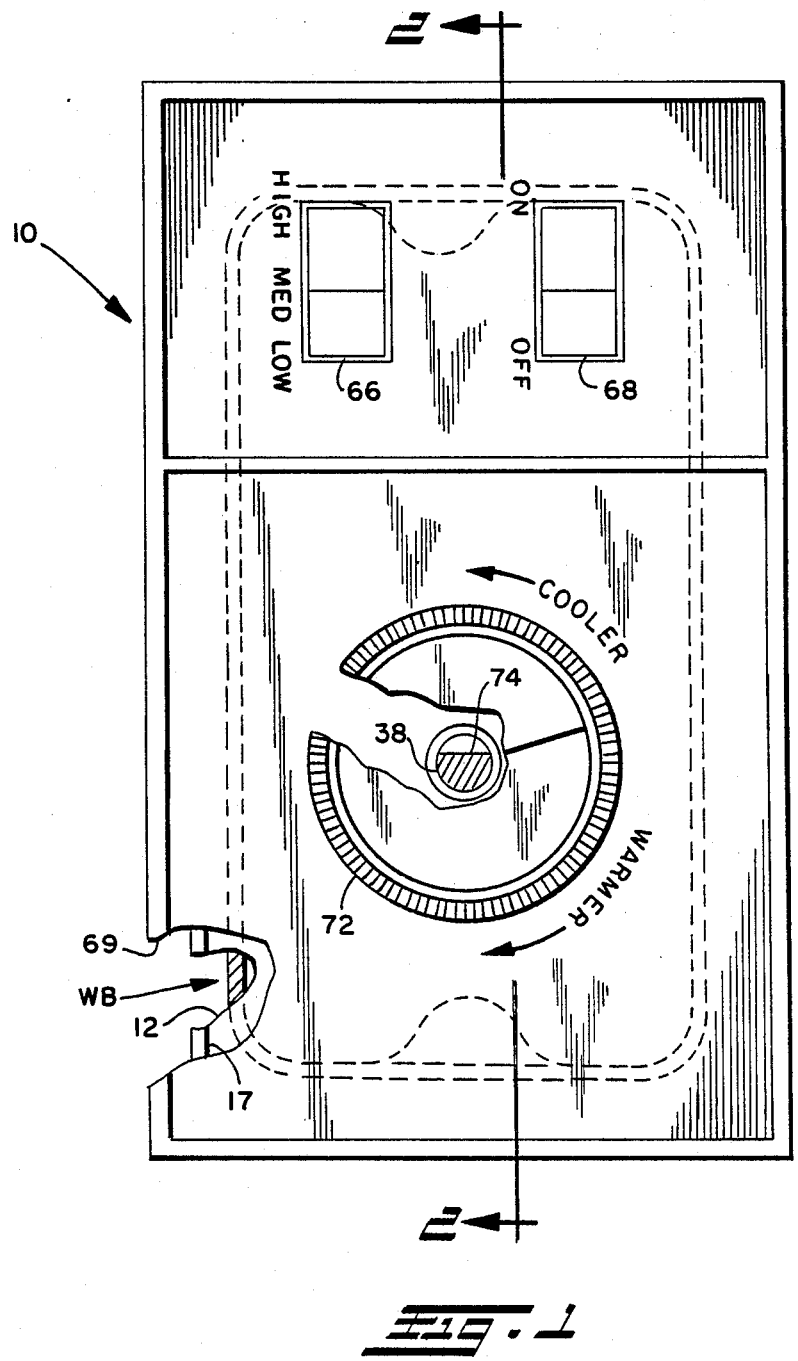
FIG. 1 is a front view of the wall thermostat assembly showing the outer cover with a portion of the control knob broken away to show the adjustment shaft.
Figure 2:
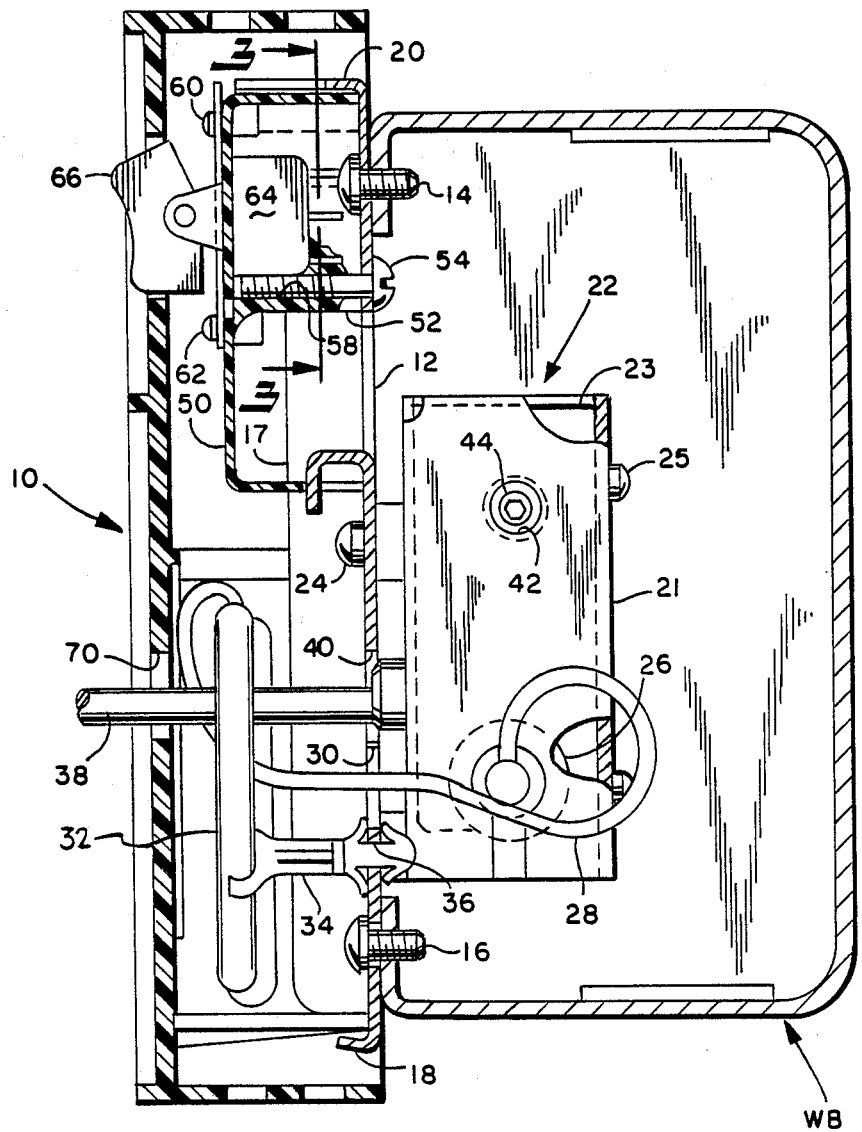
FIG. 2 is a section view taken along section-indicating line 2—2 of FIG. 1.

Referring to FIGS. 1-3, the wall thermostat assembly indicated generally at 10 is shown as mounted over a single width or "gang" electrical wall outlet box indicated generally by the reference characters WB. The assembly 10 is built upon a base plate 12 which serves as the cover for the outlet box WB and which is attached thereto from the front or outside surface thereof by suitable fasteners, as for example, screws 14, 16. Base plate 12 has upturned edge flanges formed about the margins thereof, three of which are illustrated at 17, 18, 20 in FIG. 2 and a wiring cut-out 13 shown at 13 in FIG. 3.

A suitable line power switch sub-assembly, indicated generally at 22, includes a bracket 21 which is mounted on the backside of plate 12 by suitable fasteners, such as screws, one of which is illustrated at 24 and which is received through an aperture in the plate 12 such that switch 22 is recessed within the confines of the box WP. In the presently preferred practice, the switch sub-assembly 22 includes a commercially available snap-acting switch 23 rated at 10 amperes resistive at 125 volts a.c. rms and which is mounted to bracket 21 by suitable fasteners such as illustrated typically by screw 25.

The switch 23 is actuated by a fluid filled capsule 26, which has a diaphragm or piston responsive to pressure in the capsule for actuating the switch contacts. An aperture 42 is provided in the mounting bracket for sub-assembly 22 and a suitable adjustment screw 44 is provided in the switch sub-assembly for calibration thereof. The details of the switch sub-assembly are well known in the art and omitted for the sake of brevity. Capsule 26 has attached thereto a capillary tube 28 which extends through an aperture 30 formed in the base plate 12 and has attached to the end thereof, a temperature sensing bulb 32 which is filled with liquid in communication with capsule 26. The bulb 32 is secured to the front side of base plate 12 by a suitable stanchion 34 which is preferably formed of plastic material and is anchored to base plate 12 through an aperture 36 formed therein. The switch sub-assembly has a rotatable temperature selecting shaft 38 extending outwardly therefrom through aperture 40 in base plate 12 and exteriorly of the assembly 10. Rotation of shaft 38, as will hereinafter be described, causes a change in the temperature setting at which switch 23 is actuated.

A function switch housing 50 is provided having a generally cup-shaped configuration with the opened end thereof registering against the front face of mounting plate 12. Referring to FIGS. 2 and 3, housing 50 has an internal supporting rib or stanchion 52 which extends downwardly from the undersurface of the closed face of the housing and stanchion 52 also rests against the outer face of mounting plate 12. The switch housing 50 is secured to the mounting plate 12 from the backside thereof by a suitable fastening means such as screw 54 which is accessible only from the backside of the mounting plate. Screw 54 is received through an aperture provided in mounting plate 12 and the screw engages threads 58 provided in the stanchion 52. Referring to FIG. 3, the switch housing 50 has a clearance aperature 53 provided therethrough for permitting access to the screw 14 for attaching the mounting plate 12 to the outlet box WB.

Referring to FIGS. 1 and 2, a pair of function switches 64, 65 are mounted within the switch housing 50 and attached to the underside of the closed face thereof by suitable fasteners such as screws 60, 62 extending through the face of the switch housing 50 from the exterior thereof. Each of the switches, only one of which is illustrated in FIG. 2 with reference numeral 64, has a rocker type actuator such as rockers 66, 68. The function switches are thus completely enclosed within the switch housing 50. In the presently preferred practice, housing 50 is formed of impact resistive plastic such as a polyphenylin oxide having a 264 psi compressive deflection at 230° F. and an Izod impact strength, notched, of three to four foot-pounds per inch at 73° F. and a Gardner impact strength at 73° F. of 250 inch-pounds. In the presently preferred practice, the plastic material for the switch housing 50 has a dielectric strength of 19 kilovolts per millimeter. Suitable material is available from the General Electric Company under the trademark "Noryl"; however, it will be understood that other commercially available materials meeting the above electrical and mechanical properties may also be employed.

In the presently preferred practice of the invention, one of the line function switches 64 is a three position switch employed for controlling fan speed and located on the switch housing 50 in the position illustrated in FIG. 1 wherein the rocker actuator 66 is shown in solid outline. The remaining line function switch 65 (not shown in FIG. 2) but shown schematically in FIG. 4 is a single pole single throw switch located adjacent switch 64 in spaced relationship thereto with its rocker actuator 68 illustrated in FIG. 1. Switch 65 may be of similar configuration as switch 64 for convenience of mounting.

Referring to FIGS. 1 and 2, an outer cover, preferably of plastic material is received over the base plate 12 and is attached thereto by any suitable expedient as for example, snap-locking engagement with the flanges 17, 18, 20 of the mounting plate 12. The outer cover has an aperture 70, provided therethrough for permitting shaft 38 to pass therethrough and extend outwardly. The outer face of the cover 69 has a decorative bezel and has provided thereon, suitable indicia for indicating the position of the fan control switch 64, position switch 65 and the rotary position of the shaft 38 which has a suitable knob 72 provided thereon with an indicator provided on the knob for providing visual recognition of the position of the knob. In the presently preferred practice, shaft 38 has a flat portion 74 provided thereon which has a correspondingly shaped recess in the undersurface of the knob for providing a press fit of the knob onto the shaft 38 for permitting rotation of shaft by the knob.

Referring to FIG. 4, the wall thermostat assembly 10 of the present invention is illustrated in an electrical schematic which shows the wiring of the thermostat assembly 10 in solid outline and the associated wiring for a system incorporating such a thermostat illustrated in dashed outline. One common lead of line power switch 65 is connected to one side $L_1$ of the power line; and, the common terminal of fan selector switch 64 is connected to the ON terminal of switch 65 and is also connected to the common terminal of the thermostatically operated switch 23. The switch contacts of thermostatically operated switch 23 are connected through a remote line switch to the heating or cooling load. The selected three positions of switch 64 are each connected through the fan load to the opposite side $L_2$ of the power line.

Referring to FIG. 3, it will be understood that wiring from the switches 64, 65 passes through cut-out 13 to switch 23 and to the power line leads in outlet box WB.

The wall thermostat of the present invention is thus readily and conveniently mounted on a single width electrical wall outlet box and has a bulb-and-capillary type thermostat with the line voltage thermostatically operated switch mounted on the back of the wall outlet cover plate so as to be inaccessible from the exterior. Line voltage function switches are mounted on the front face of the box cover plate and have an electrically insulating, impact resistant plastic housing thereover which is attached to the outlet box cover plate from the backside so as to be nonremovable without first removing the wall outlet box cover plate. The present invention thus provides a compact and economical line voltage thermostat assembly having line voltage function switches thereon which is conveniently mountable on a single width outlet box. The assembly of the invention, when installed on a recessed wall outlet box prevents the operator from having access to the line voltage components without deliberate removal of the entire assembly from the wall outlet box.

Although the invention has been described above with respect to the illustrated embodiment, it will be understood that the invention is capable of modification and variation and is limited only by the following claims.

I claim:

1. A line voltage temperature controller for an electrically operated heating and cooling system comprising:
    (a) a metal baseplate adapted for mounting on a single width electrical outlet box and having at least one cutout therethrough, and baseplate having provision for attachment over said box;
    (b) a thermostatically actuated line voltage switch mounted to the backside of said baseplate for being received in a single width electrical outlet box upon mounting of said baseplate thereover, said thermostatic switch including a bulb and capillary fluid expansion actuator with said bulb mounted on the front side of said baseplate;
    (c) a switch cover formed of impact resistant plastic material and mounted on the face of said baseplate covering said cut out and retained thereon;
    (d) line voltage function switch means mounted on said switch cover interiorly thereof with an actuator therefor extending through said cover and exteriorly thereof with said actuator electrically isolated from the line voltage components of said switch, and including insulated lead means from said switch means through said wiring cutout to the backside of said baseplate said lead means completely encased by said cover and thereby inaccessible on the frontside of said baseplate;
    (e) fastening means operable to secure said switch cover to said baseplate, said fastening means accessible only from the backside of said baseplate;
    (f) an outer cover disposed over said baseplate, said switch cover and said bulb and capillary, said outer cover providing for access to said function switch means actuator from the exterior thereof.

2. The temperature controller defined in claim 1, wherein said thermostatic switch includes a shaft extending through said baseplate and through said outer cover and operable upon rotation to vary the temperature responsive set point of said thermostatic switch.

3. The temperature controller defined in claim 1, wherein said switch cover includes an interior rib extending to said baseplate for absorbing impact loading and upon impact resist contact of the line voltage components with said baseplate.

4. The temperature controller defined in claim 1, wherein said switch cover has an interior support rib extending to said baseplate; and, said support rib has an aperture therethrough for enabling access for fastening said baseplate to an outlet box.

5. The temperature controller defined in claim 1, wherein said baseplate has upturned flanges about the margins thereof for providing stiffening.

6. The temperature controller defined in claim 1, wherein said function switch means comprises a selector switch selecting heating or cooling and a fan switch for controlling a fan.

7. The temperature controller defined in claim 1, wherein said function switch means comprises a rocker type switch.

8. The temperature controller defined in claim 1, wherein said outer cover has a decorative bezel including switch position indicia.

9. The temperature controller defined in claim 1, wherein said thermostatic switch includes a rotatable shaft extending through said baseplate and outer cover for providing temperature set point adjustment with knob means thereon for indicating the position thereof; and, said outer cover includes reference indicia for said set point adjustment.

10. The temperature controller defined in claim 1, wherein said function switch means comprises a pair of rocker switches with one rocker switch operative for selection of heating or cooling function and the other operative for selection of any of a plurality of air blower speeds.

* * * * *